(12) United States Patent
Obe (10) Patent No.: US 12,449,407 B2
(45) Date of Patent: Oct. 21, 2025

(54) SAMPLING DEVICE

(71) Applicant: SHIMADZU CORPORATION, Kyoto (JP)

(72) Inventor: Tatsuya Obe, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 290 days.

(21) Appl. No.: 18/203,003

(22) Filed: May 29, 2023

(65) Prior Publication Data

US 2024/0011951 A1 Jan. 11, 2024

(30) Foreign Application Priority Data

Jul. 11, 2022 (JP) ................. 2022-111097

(51) Int. Cl.
*G01N 30/24* (2006.01)
*G01N 30/20* (2006.01)

(52) U.S. Cl.
CPC ....... *G01N 30/24* (2013.01); *G01N 2030/201* (2013.01); *G01N 2030/202* (2013.01)

(58) Field of Classification Search
CPC .... G01N 30/24; G01N 35/10; G01N 35/1011; B08B 3/04; B08B 3/08
See application file for complete search history.

(56) References Cited

U.S. PATENT DOCUMENTS

2010/0210007 A1* 8/2010 Iwamura ............ G01N 35/1011 435/286.2
2010/0326215 A1* 12/2010 Maeda ............... G01N 35/1097 73/864.21
2012/0285268 A1 11/2012 Maeda
2022/0178958 A1* 6/2022 Mizutani ................ G01N 35/04

FOREIGN PATENT DOCUMENTS

JP 3857931 B2 * 12/2006 ............ G01N 21/72
JP 2012-237557 A 12/2012
WO 2009/041441 A1 4/2009

OTHER PUBLICATIONS

English Machine Translation of JP-3857931-B2 (Year: 2006).*

* cited by examiner

*Primary Examiner* — David Z Huang
(74) *Attorney, Agent, or Firm* — Renner, Otto, Boisselle & Sklar, LLP

(57) ABSTRACT

A sampling needle (21) is inserted into a sample container (12) by a needle-driving mechanism (23) to collect a sample liquid from the sample container. A depth information acquirer (52) acquires insertion depth information, i.e., a piece of information concerning an insertion depth of the sampling needle into the sample container. A needle-rinsing length setter (54) sets a needle-rinsing length which is an insertion length of the sampling needle into a rinse storage tank (30) having an open top, based on the insertion depth information. A controller (51) controls the needle-driving mechanism so that a portion of the sampling needle extending from the tip of the sampling needle over the needle-rinsing length is inserted into the rinse storage tank. The needle-rinsing length setter is configured to set a shorter needle-rinsing length for a smaller insertion depth of the sampling needle into the sample container, to shorten the needle-cleaning time.

9 Claims, 5 Drawing Sheets

SAMPLING DEVICE

TECHNICAL FIELD

The present invention relates to a sampling device.

BACKGROUND ART

Sampling devices are a type of device which collects a liquid sample from a sample container and injects it into an analyzing device, another container or other locations. For example, an autosampler, liquid handler or other types of devices are commonly known as sampling devices. A liquid handler, which is a device used as an annex to a liquid chromatograph, is configured to function as both an autosampler for introducing a sample liquid into a passage which leads to a column in the liquid chromatograph, and a fraction collector for preparative separation of an eluate from the column.

A sampling device has a needle for suctioning a sample liquid. The needle can be driven in the front/back, right/left and up/down directions by a predetermined driving mechanism. When a sample liquid is to be collected with the needle, the driving mechanism is initially operated to change the position of the needle in the front/back and right/left directions to transfer the needle to a position directly above the sample container. The needle is subsequently lowered into the sample container. With the tip of the needle located at a specific position near the inner bottom of the sample container, the sample liquid is suctioned from the tip of the needle. The suctioned sample liquid is temporarily held in a sample loop connected to the base end of the needle. Subsequently, a passage-switching operation is performed so as to insert the sample loop into a passage which leads to a liquid chromatograph or similar analyzing device, whereby the sample liquid is introduced into the analyzing device. In another possible operation, the needle into which the sample has been suctioned is transferred to a predetermined injection area (e.g., a sample injection port or another container), where the needle is operated to eject the sample liquid from its tip, whereby the liquid is injected into the injection area.

In this type of sampling device, a plurality of sample containers are normally set, and the sample liquids held in the sample containers are sequentially collected with a single needle. Therefore, in order to prevent cross contamination between the sample containers, a needle-cleaning process is performed for every execution of the sample-collecting operation from one sample container (for example, see Patent Literature 1).

CITATION LIST

Patent Literature

Patent Literature 1: WO 2009/041441 A

SUMMARY OF INVENTION

Technical Problem

In the cleaning process, the needle is immersed in a predetermined kind of rinse liquid held in a rinse port in order to remove the sample liquid adhered to the outer circumferential surface of the needle. Specifically, the aforementioned driving mechanism is operated to transfer the needle to a position directly above the rinse port and subsequently lower the needle so that a portion of the needle extending from the tip of the needle over a specific length is immersed in the rinse liquid in the rinse port. However, the period of time required for cleaning the needle in this manner has been a cause of a decrease in the throughput of the sampling operation since there are a considerable number of sample containers set in the sampling device, for which the needle-cleaning process must be performed for every execution of the operation of collecting a sample liquid from one sample container, as described earlier.

In the case of the liquid handler mentioned earlier, a portion of the eluate from the column may be preparatively collected in a test tube or similar container having a comparatively large depth, and the eluate in this container may be sampled and once more introduced into the column. This type of liquid handler often uses a longer needle than a device which uses only short sample containers having a comparatively small depth, such as vials. Therefore, the aforementioned decrease in the throughput due to the needle-cleaning process is particularly noticeable.

The present invention has been developed in view of the previously described points. Its objective is to reduce the period of time required for cleaning the needle in a sampling device.

Solution to Problem

A sampling device according to the present invention developed for solving the previously described problem includes:
  a sampling needle configured to be inserted into a sample container to collect a sample liquid in the sample container;
  a needle-driving mechanism configured to change the position of the sampling needle;
  a depth information acquirer configured to acquire insertion depth information which is a piece of information concerning an insertion depth of the sampling needle into the sample container;
  a rinse storage tank having an opening on the top;
  a needle-rinsing length setter configured to set a needle-rinsing length which is an insertion length of the sampling needle into the rinse storage tank, based on the insertion depth information; and
  a controller configured to control the needle-driving mechanism so that a portion of the sampling needle extending from the tip of the sampling needle over the needle-rinsing length is inserted into the rinse storage tank,
  where the needle-rinsing length setter is configured to set the needle-rinsing length to be shorter as the insertion depth of the sampling needle into the sample container becomes smaller.

Advantageous Effects of Invention

The sampling device according to the present invention having the previously described configuration can reduce the period of time required for cleaning the needle.

DESCRIPTION OF EMBODIMENTS

First Embodiment

Figure 1:
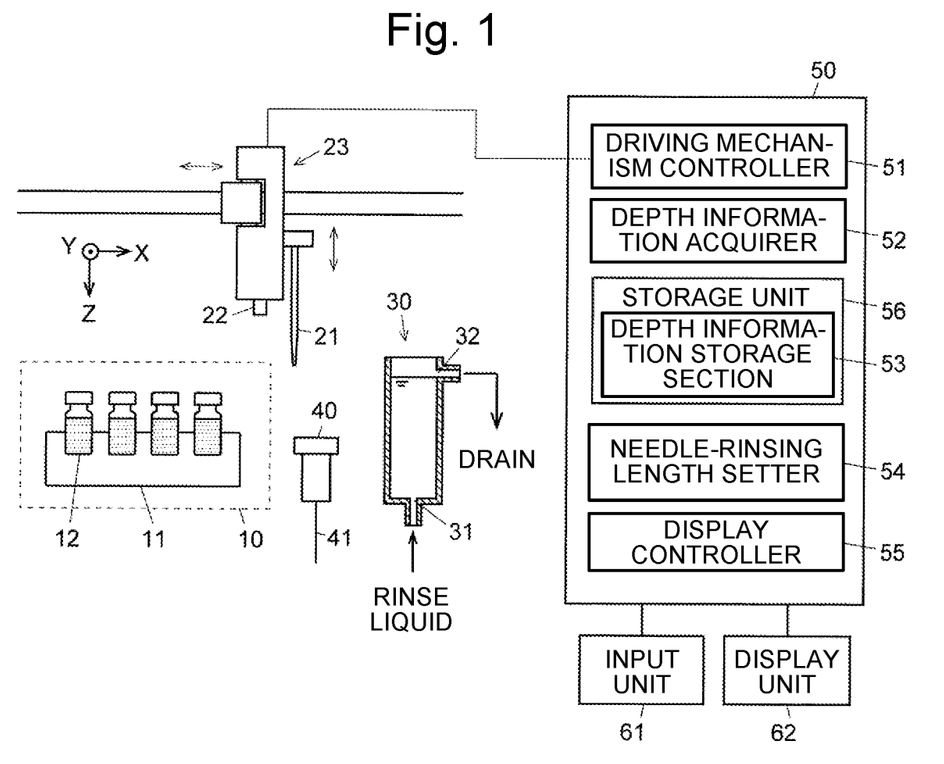
FIG. 1 is a schematic configuration diagram of a liquid handler according to the first embodiment of the present invention.

Modes for carrying out the present invention are hereinafter described with reference to the drawings. FIG. 1 is a schematic configuration diagram of a liquid handler according to the first embodiment of the present invention.

The liquid handler according to the present embodiment is configured to be annexed to a liquid chromatograph (not shown) and function as both an autosampler for introducing a sample liquid into a passage which leads to a column in the liquid chromatograph, and a fraction collector for preparative separation of an eluate from the column. The present liquid handler includes: a rack-holding section 10 in which a container rack 11 is to be held; a sampling needle (which is hereinafter simply called the "needle") 21 for collecting sample liquids from sample containers 12, such as test tubes or vials, placed on the container rack 11; a nozzle 22 from which an eluate from a column (not shown) is ejected into a preparative separation container (not shown), such as a test tube, placed on the container rack 11; a rinse port (which corresponds to the "rinse storage tank" in the present invention) 30 for cleaning the outer circumferential surface of the needle 21; an injection port 40 into which a sample collected with the needle 21 is to be injected; and a control unit 50.

The needle 21 (and the nozzle 22) can be driven in the horizontal direction, i.e., the X and Y axis directions in FIG. 1, as well as in the vertical direction, i.e., the Z-axis direction in FIG. 1, by a driving mechanism 23 (which corresponds to the "needle-driving mechanism" in the present invention) which includes a motor and other components. By this mechanism, the needle 21 can be transferred to a position above each of the sample containers 12 (or preparative separation container) on the container rack 11, the rinse port 30 and the injection port 40, and be inserted into each of these containers and ports. A measuring pump (not shown) is connected to the base end of the needle 21 via a tube (not shown). By operating the measuring pump, the suction and ejection of a liquid through the needle 21 can be performed. It should be noted that the function of the preparative separation of an eluate from the column (i.e., the function as a fraction collector) is not directly related to the present invention, and therefore, detailed descriptions of this function will be omitted.

The rinse port 30 is shaped like a cup having an opening on its top, with a rinse inlet 31 provided in its bottom portion and a rinse outlet 32 in its upper portion of the side wall. A rinse liquid (cleaning liquid) is supplied to the rinse inlet 31 by a pump (not shown). The rinse liquid introduced from the rinse inlet 31 into the rinse port 30 is made to overflow from the rinse outlet 32, whereby the rinse liquid within the rinse port 30 is replaced, with the liquid surface within the rinse port 30 constantly maintained at a specific level. As for the rinse liquid, a liquid having the same composition as the mobile phase used in the liquid chromatograph mentioned earlier is typically used. However, the liquid is not limited to this example; an appropriate kind of liquid can be used, such as an organic solvent (e.g., methanol or acetonitrile), water or a combination of these substances. The provision of the rinse inlet 31 in the rinse port 30 is optional; the supply of the rinse liquid into the rinse port 30 may be achieved by using the needle 21 so as to collect an amount of rinse liquid from a specific rinse liquid container and eject that amount of rinse liquid into the rinse port 30.

The control unit 50 includes, as its functional blocks, a driving mechanism controller 51 (which corresponds to the "controller" in the present invention) configured to control the operation of the drive mechanism 23, a depth information acquirer 52, a needle-rinsing length setter 54, and a display controller 55, as well as a storage unit 56. The storage unit 56 has a depth information storage section 53. An input unit 61 including a pointing device (e.g., a mouse) or a keyboard, as well as a display unit 62 including a liquid display are connected to the control unit 50. The input unit 61, display unit 62 and display controller 55 mentioned earlier cooperate with each other to function as the "rack identification information acquirer" in the present invention. The control unit 50 is embodied by a dedicated computer, a multi-purpose computer (such as a personal computer) or a combination of those types of computers. The functions of the aforementioned functional blocks are realized in the form of software components by the CPU(s) in a computer constituting the control unit 50 by loading, into the memory of the computer, a dedicated program installed on an HDD (hard disk drive), SSD (solid state drive) or similar large capacity storage device and executing the same program. The dedicated program does not need to be an independent program; there is no specific requirement on the form of the program. For example, it may be a functional component included in a program for controlling a liquid chromatograph.

In the rack-holding section 10, various types of container racks 11 can be set which are different in the number and/or arrangement of sample containers 12 that can be placed. A container rack 11 designed to carry a specific type of sample containers 12 may also be used for carrying another type of sample containers which have the same outer diameter as the former type of sample containers 12 and a different length (depth). Accordingly, in order to appropriately collect a sample from each sample container 12 set in the container rack 11, it is necessary to previously register related information in the control unit 50, such as the number and arrangement of the sample containers 12 on the container rack 11 as well as the depth of the sample containers 12 to be set on the container rack 11 (these items of information are hereinafter called the "rack layout information"). A procedure for registering the rack layout information is hereinafter described with reference to the flowchart in FIG. 2.

Initially, the user performs a predetermined operation with the input unit 61. Then, under the control of the display controller 55, a predetermined input screen is displayed on the display unit 62. The input screen is configured to receive inputs of the rack layout information by the user, including the information concerning the arrangement of the sample containers 12 on the container rack 11 (e.g., the number of sample containers 12 to be arrayed in each of the X and Y axis directions) and the information concerning the depth of the sample containers 12 (i.e., the distance from the upper end to the inner bottom surface of the sample container 12, as indicated by reference sign "A" in FIGS. 4 and 6). The depth information of the sample containers 12 (hereinafter called the "container depth information") in the present example corresponds to the "insertion depth information" in the present invention.

Figure 2:
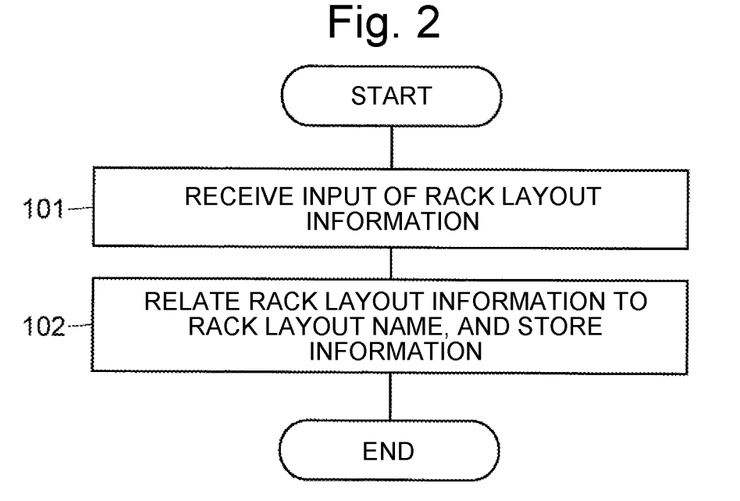
FIG. 2 is a flowchart showing a procedure for registering rack layout information in the aforementioned liquid handler.

After inputting the rack layout information on the input screen (Step 101) and entering the name to be given to the rack layout information (hereinafter called the "rack layout name"), the user performs a predetermined operation with the input unit 61, whereupon the rack layout information is saved in the depth information storage section 53, being related to the rack layout name (Step 102). The rack layout name in the present example corresponds to the "rack identification information" in the present invention.

The input screen may be configured to allow the user to numerically input the depth of the sample containers 12. As another example, the same screen may be configured allow the user to input identification information representing the type of sample containers 12 (e.g., the name, model number of the sample containers 12, or an appropriate character string), with the controller 50 configured to identify the depth of the sample container 12 from that information and save this depth in the depth information storage section 53. In this case, the manufacturer or the user of the liquid handler according to the present embodiment should previously relate the identification information to the container depth information and store these pieces of information in the storage unit 56 for each of the plurality of types of sample containers 12 to be used in the liquid handler concerned.

In addition to the rack layout information, the storage unit 56 also holds a "batch table" and "teaching information". The batch table describes what amount of sample liquid should be collected in what order from each of the sample containers 12 on the container rack 11. The teaching information describes, for a specific sample container 12 among the large number of sample containers 12 set on the container rack 11, the X, Y and Z coordinates of the center of the top opening of the sample container 12 (or the amount of driving motion of the driving mechanism 23 required for transferring the tip of the needle 21 from the initial position to the center of the top opening). The batch table and the teaching information are prepared beforehand by the control unit 50 based on an instruction from the user. Since they are not directly related to the present invention, detailed descriptions of these pieces of information will be omitted.

A liquid handler is normally configured to clean the outer circumference of the needle 21 by inserting the needle 21 into the rinse port 30 by a predetermined length from its tip (this length is hereinafter called the "needle-rinsing length") after a sample liquid has been collected from one sample container 12. Conventional liquid handlers are configured to always apply the same needle-rinsing length to one needle 21 (e.g., a length with which the needle 21 is almost entirely immersed in the rinse liquid). By comparison, the liquid handler according to the present embodiment is configured to apply a different needle-rinsing length according to the depth of the sample container 12. The procedure for setting the needle-rinsing length, and the procedure for performing subsequent operations from sample collection to sample injection in the present embodiment are hereinafter described with reference to the flowchart in FIG. 3.

Figure 3:
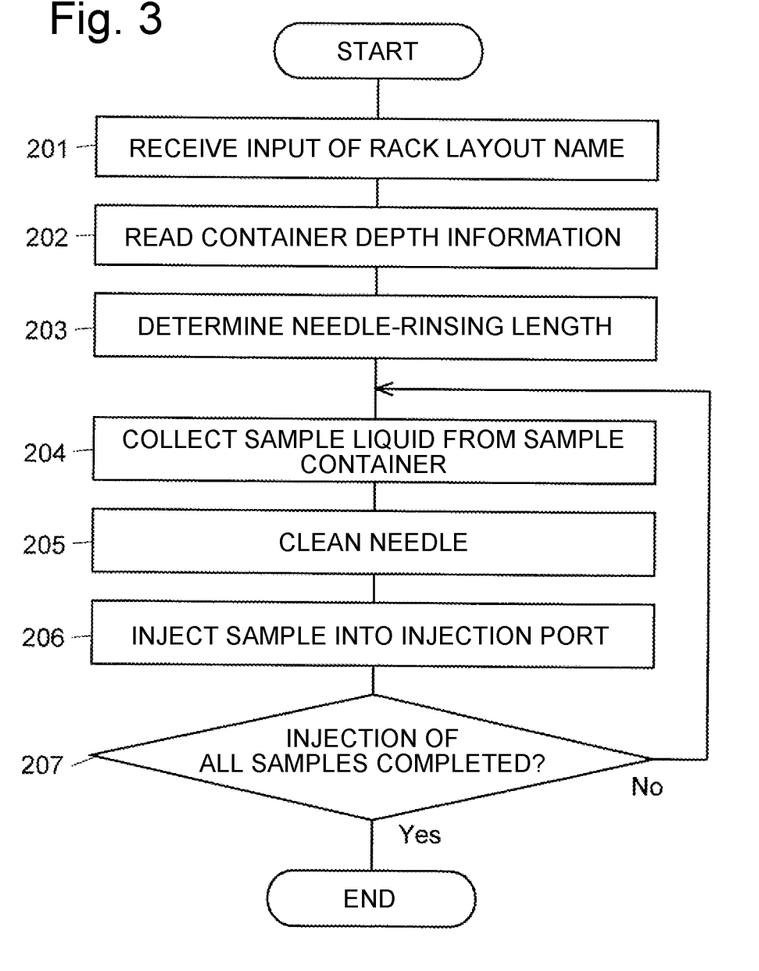
FIG. 3 is a flowchart showing a procedure for setting the needle-rinsing length and the subsequent procedure from sample collection to sample injection in the aforementioned liquid handler.

Initially, the user sets a plurality of sample containers 12 on the container rack 11, with each sample container 12 holding a sample liquid, and places the container rack 11 in the rack-holding section 10. Subsequently, the user performs a predetermined operation with the input unit 61. Then, under the control of the display controller 55, the rack layout names saved in the depth information storage section 53 are listed on the display unit 62. From this list, the user selects a rack layout name corresponding to the combination of the container rack 11 and the sample containers 12 which are going to be used, i.e., the combination of the container rack 11 and the sample container 12 held in the rack-holding section 10 (Step 201). The depth information acquirer 52 identifies the rack layout information related to the selected rack layout name in the depth information storage section 53 and reads the container depth information included in the identified rack layout information (Step 202). The needle-rinsing length setter 54 determines a needle-rinsing length based on this container depth information and saves the value in the storage unit 56 (Step 203).

Figure 4:
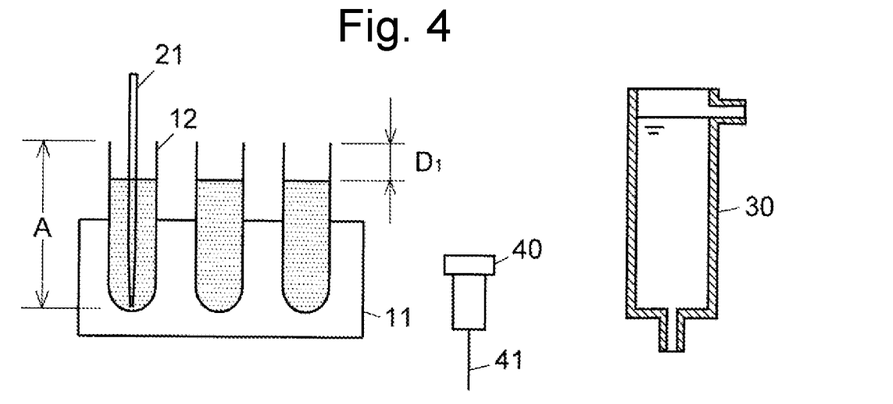
FIG. 4 is a model diagram showing a situation in which a sample is being collected from a sample container having a large depth in the aforementioned liquid handler.
Figure 5:
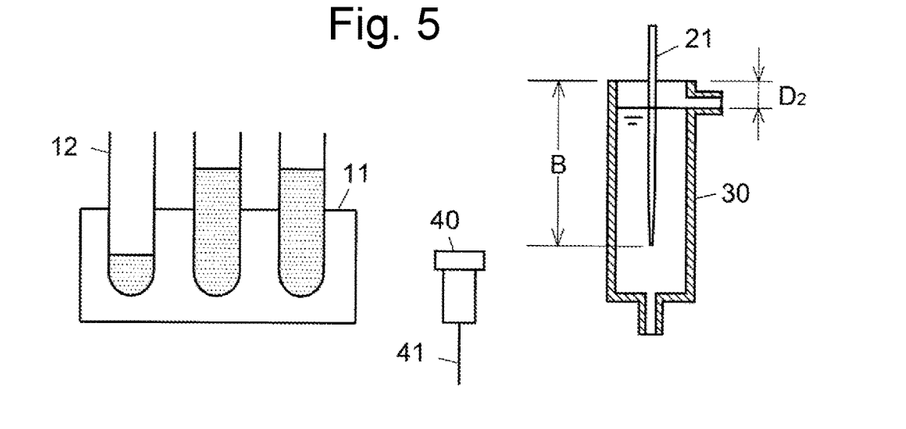
FIG. 5 is a model diagram showing the process of cleaning the needle with which the sample has been collected from the aforementioned sample container.
Figure 6:
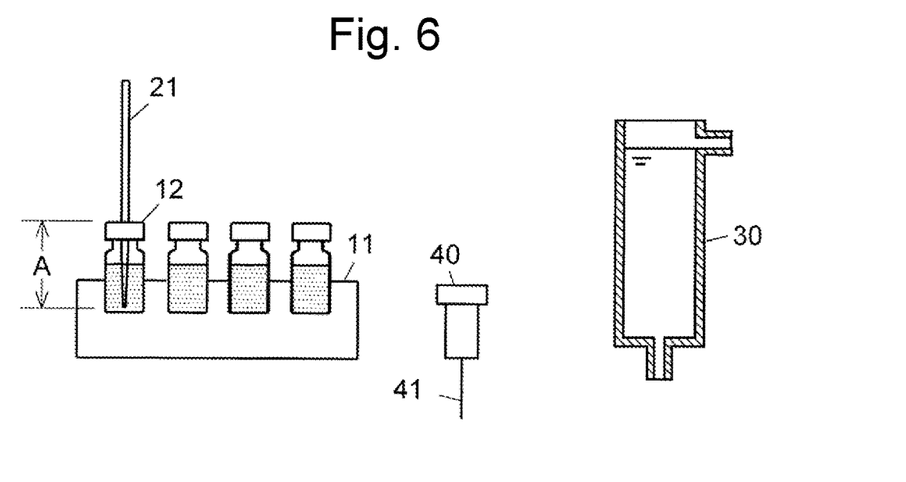
FIG. 6 is a model diagram showing a situation in which a sample is being collected from a sample container having a small depth in the aforementioned liquid handler.
Figure 7:
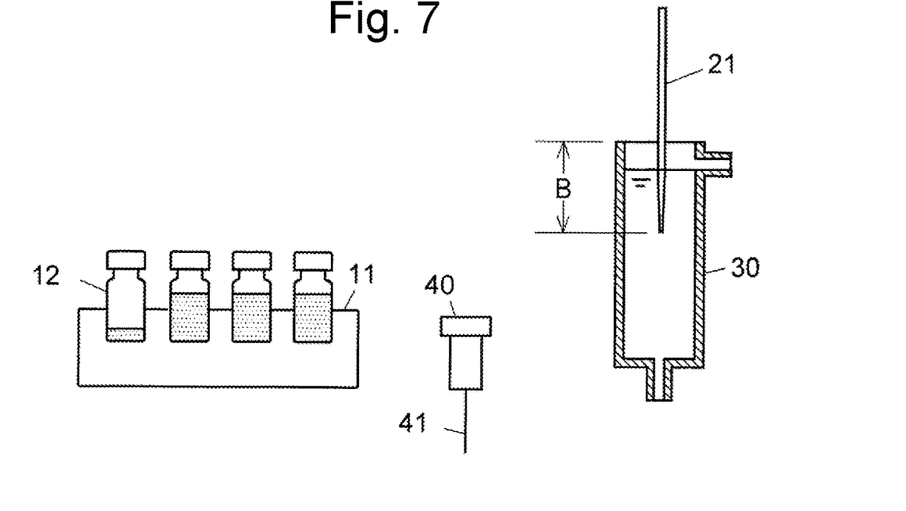
FIG. 7 is a model diagram showing the process of cleaning the needle with which a sample has been collected from the aforementioned sample container.

In Step 203, the needle-rinsing length is set to be the minimally required length for removing the sample liquid adhered to the outer circumferential surface of the needle 21 due to the insertion into the sample container 12. Specifically, when the depth A of the sample containers 12 is relatively large, the needle-rinsing length B is increased accordingly, as shown in FIGS. 4 and 5. When the depth A of the sample containers 12 is relatively small as shown in FIGS. 6 and 7, the needle-rinsing length B is decreased accordingly.

For example, the needle-rinsing length B may be given a value equal to the depth A of the sample container 12. In normal cases, the distance between the upper end of the sample container 12 and the level of the sample liquid held in the sample container 12 (this distance is hereinafter called "distance $D_1$") is sufficiently larger than the distance between the upper end of the rinse port 30 and the level of the sample liquid held in the rinse liquid in the rinse port 30 (this distance is hereinafter called "distance $D_2$"). Therefore, by setting the needle-rinsing length B to be equal to the depth A of the sample container 12, the portion of the needle 21 to which the sample liquid may possibly be adhered can be assuredly immersed in the rinse liquid. If distance $D_1$ is smaller than distance $D_2$, the value obtained by adding a length corresponding to the difference between those two distances (i.e., the value of $D_2-D_1$) to the depth A of the sample container 12 should be used as the needle-rinsing length B. For an even more reliable cleaning of the needle, the needle-rinsing length B may be given a value larger than the depth A of the sample container 12 (or the value obtained by adding $D_2-D_1$ to depth A). In that case, it is preferable that the needle-rinsing length B should not exceed 110% of the depth A of the sample container 12 (or the value obtained by adding $D_2-D_1$ to depth A).

Subsequently, the user performs a predetermined operation with the input unit 61. Then, under the control of the control unit 50, the operation of collecting sample liquids from the sample containers 12 is performed (Step 204). Specifically, the driving mechanism controller 51 operates the driving mechanism 23 based on the batch table, teaching information and rack layout information read in Step 202, so as to transfer the needle 21 to a position directly above the sample container 12 specified in the batch table and subsequently lower the needle 21 into the sample container 12. With the tip of the needle 21 located close to the inner bottom surface of the sample container 12 (FIG. 4), the aforementioned measuring pump is operated to suction the sample liquid from the sample container 12 into the needle 21 (and the tube connected to the base end of the needle 21) by an amount specified in the batch table.

Subsequently, the cleaning of the needle 21 is performed to remove the sample liquid adhered to the outer circumferential surface of the needle 21 (Step 205). Specifically, the driving mechanism controller 51 operates the driving mechanism 23 to initially transfer the needle 21 to a position directly above the rinse port 30. From this situation in which the tip of the needle 21 is pointed at the center of the top opening of the rinse port 30, the needle 21 is lowered by the needle-rinsing length B which was set in Step 203. As a result, the portion of the needle 21 extending from the tip of the needle 21 over the needle-rinsing length B is inserted into the rinse port 30 (FIG. 5).

After a predetermined period of time from that point in time, the injection of the sample into the injection port 40 is performed under the control of the control unit 50 (Step 206). Specifically, the driving mechanism 23 is operated to initially transfer the needle 21 to a position directly above the injection port 40 and subsequently lower the needle 21 so that the tip of the needle 21 plunges into the injection port 40. The aforementioned measuring pump is subsequently operated to inject the sample liquid in the needle 21 (and the tube connected to the base end of the needle) into the injection port 40. A sample introduction passage 41 is connected to the injection port 40. The sample liquid injected into the injection port 40 is introduced through this sample introduction passage 41 into an analysis passage (which is a passage leading to the column) in the liquid chromatograph.

Subsequently, the control unit 50 refers to the batch table and determines whether or not the collection of the samples from all sample containers 12 specified in the batch table has been completed (Step 207). If the result of Step 207 is "No", the operation returns to Step 204 to perform the sample collection from the next sample container 12 specified on the batch table. After that, Steps 204-207 are repeated until the result of Step 207 becomes "Yes", at which point the entire sequence of operations by the liquid handler is completed.

As described thus far, in the liquid handler according to the present embodiment, the needle-rinsing length is automatically set to be an appropriate value according to the depth of the sample container 12. When the depth of the sample container 12 is relatively small, both the period of time required for inserting the needle 21 into the rinse port 30 and the period of time required for pulling the needle 21 from the rinse port 30 can be reduced as compared to the case where the depth of the sample container 12 is relatively large. Consequently, the sample collection can be performed with a higher level of throughput than in the case where the almost entire portion of the needle 21 is always immersed in the rinse liquid in the cleaning process regardless of the depth of the sample container 12.

In the previously described example, the user is required to input the depth of the sample container 12 in Step 101. Alternatively, the user may be required to input the information of the amount of descent of the tip of the needle 21 from the position of the upper end of the sample container 12 (i.e., the coordinates of the center of the top opening) in the sample-collecting process, and the needle-rinsing length may be set based on that value. In this case, the information of the "amount of descent of the tip of the needle 21 from the position of the upper end of the sample container 12" corresponds to the "insertion depth information" in the present invention. Once again, the needle-rinsing length should be the minimally required length for removing the sample liquid adhered to the outer circumferential surface of the needle 21, e.g., a length within a range from 100% to 110% of the value of the "amount of descent of the tip of the needle 21 from the position of the upper end of the sample container 12". It is also possible to require the user to input the amount of descent of the needle 21 from a predetermined reference position in place of the "amount of descent of the tip of the needle 21 from the position of the upper end of the sample container 12". In this case, the value of the "amount of descent of the tip of the needle 21 from the position of the upper end of the sample container 12" can be calculated from the value of the "amount of descent of the needle 21 from a predetermined reference position" and the distance from the reference position to the upper end of the sample container 12.

Second Embodiment

Figure 8:
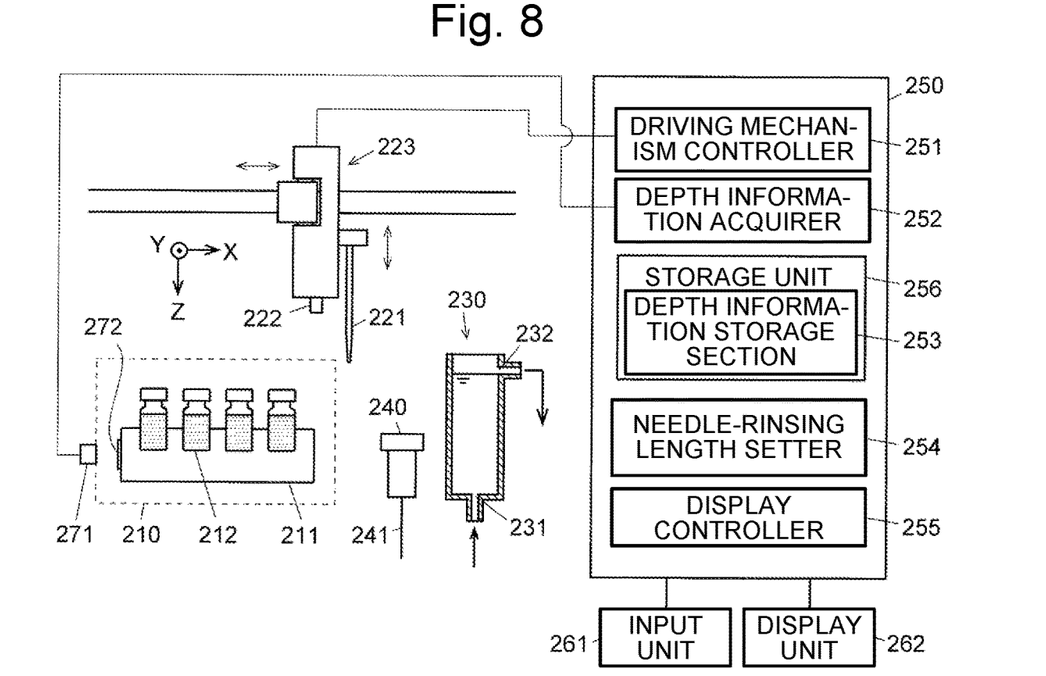
FIG. 8 is a schematic configuration diagram of a liquid handler according to the second embodiment of the present invention.

FIG. 8 is a schematic configuration diagram of a liquid handler according to the second embodiment of the present invention. Each component which has an identical or corresponding counterpart in the first embodiment is denoted by a reference sign having the same last two digits, and its description will be appropriately omitted.

The liquid handler according to the present embodiment includes a rack information reader 271 (which corresponds to the "rack identification information acquirer" in the present invention) for reading identification information given to the container rack 211. The rack information reader 271 can be configured using a reader for reading information from a contactless IC tag, such as RFID (radio frequency identification). In this case, an IC tag which holds rack identification information, which is the identification information of the container rack 211, should be attached to the container rack 211 beforehand. Furthermore, for each of a plurality of types of container racks 211 to be used in the liquid handler according to the present embodiment, the rack identification information held in the IC tag 272 attached to the container rack 211 concerned, and the "insertion depth information" of the sample container 212 which will be placed on the container rack 211 concerned, should be related to each other and stored in the depth information storage section 253 beforehand. The "rack identification information" is a piece of information for identifying the type of container rack. For example, it may be the name or model number of the container rack 211, or a character string appropriately set by the user or manufacturer of the liquid handler. It should be noted that the present embodiment assumes that the type of container rack 211 uniquely determines the length (depth) of the sample containers 21 to be placed on the container rack 211. The information stored in the depth information storage section 253 may be previously set by the manufacturer of the liquid handler according to the present embodiment, or it may be entered by the user through the input unit 261.

In the liquid handler according to the present embodiment, the rack information reader 271 reads the information recorded in the IC tag 272 (i.e., rack identification information) at the point in time where the container rack 211 has been set in the rack-holding section 210 or at the point in time where the user has entered a predetermined instruction through the input unit 261. The depth information acquirer 252 retrieves the insertion depth information related to the rack identification information from the depth information storage section 253. The needle-rinsing length setter 254 sets the needle-rinsing length based on the insertion depth information. The method for setting the needle-rinsing length as well as the subsequent operations in the present case are similar to those of the first embodiment, and therefore, detailed descriptions will be omitted.

As described thus far, the liquid handler according to the present embodiment automatically reads rack identification information from the container rack 211 in the rack-holding section 210. This eliminates the time and labor for the user to manually input the rack identification information.

In the previously described example, the IC tag 272 is attached to the container rack 211, and this tag is read with the rack information reader 271 including an IC tag reader. The method for acquiring the rack identification information is not limited to this form. For example, one or more portions having a three-dimensional form representing the rack identification information may be provided on the container rack 211, and the rack identification information may be obtained by reading those portions with one or more photosensors (which correspond to the "rack identification information acquirer" in the present invention). A barcode may be attached to the container rack 211, and the rack identification information may be obtained by reading the barcode with a barcode reader (which corresponds to the "rack identification information acquirer" in the present invention). A two-dimensional code may be attached to the container rack 211, or an identifier consisting of numbers, letters and/or other characters representing the type of container rack 211 may be directly attached to this rack, and the rack identification information may be obtained by taking an image of the code or identifier with a camera (which corresponds to the "rack identification information acquirer" in the present invention).

Third Embodiment

Figure 9:
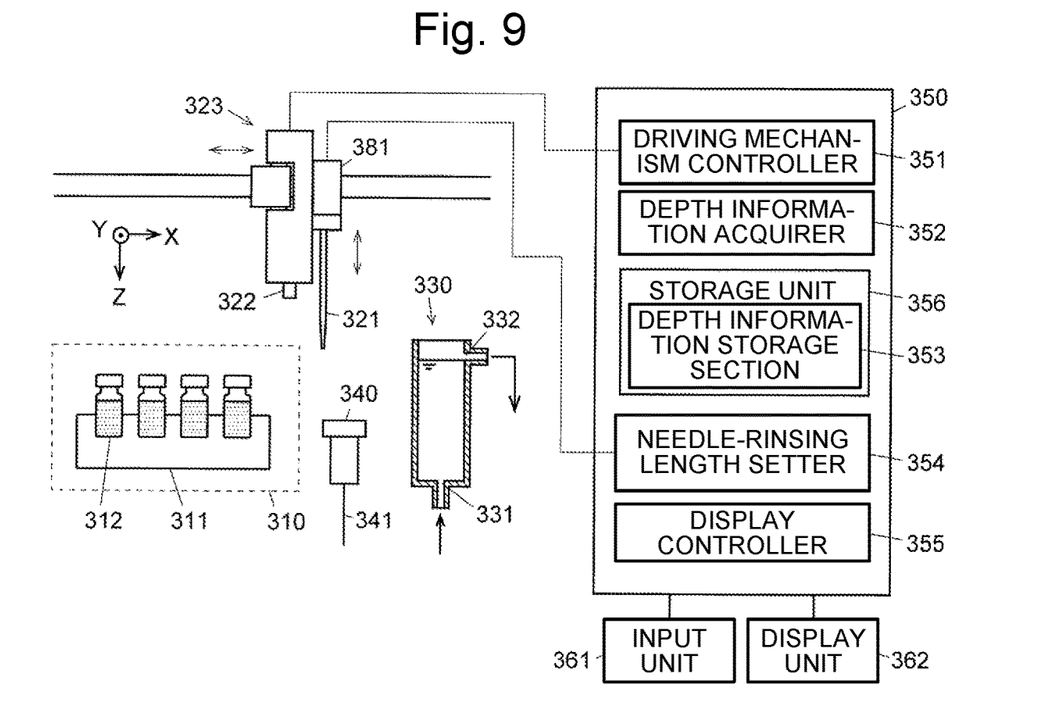
FIG. 9 is a schematic configuration diagram of a liquid handler according to the third embodiment of the present invention.

FIG. 9 is a schematic configuration diagram of a liquid handler according to the third embodiment of the present invention. Each component which has an identical or corresponding counterpart in the first embodiment is denoted by a reference sign having the same last two digits, and its description will be appropriately omitted.

The liquid handler according to the present embodiment includes a liquid surface detector 381 for detecting whether or not the tip of the needle 321 is in contact with the surface of the sample liquid. The liquid surface detector 381 is configured to detect the liquid surface by utilizing the fact that the capacitance of an electric circuit including the needle 321 changes when the tip of the needle 321 is in contact with a liquid surface. It should be noted that the liquid surface detector 381 is not limited to a capacitance type of sensor. For example, it may be a pressure type sensor configured to detect a liquid surface by utilizing the fact that the pressure within the needle 321 changes when the tip of the needle 321 is in contact with a liquid surface.

Figure 10:
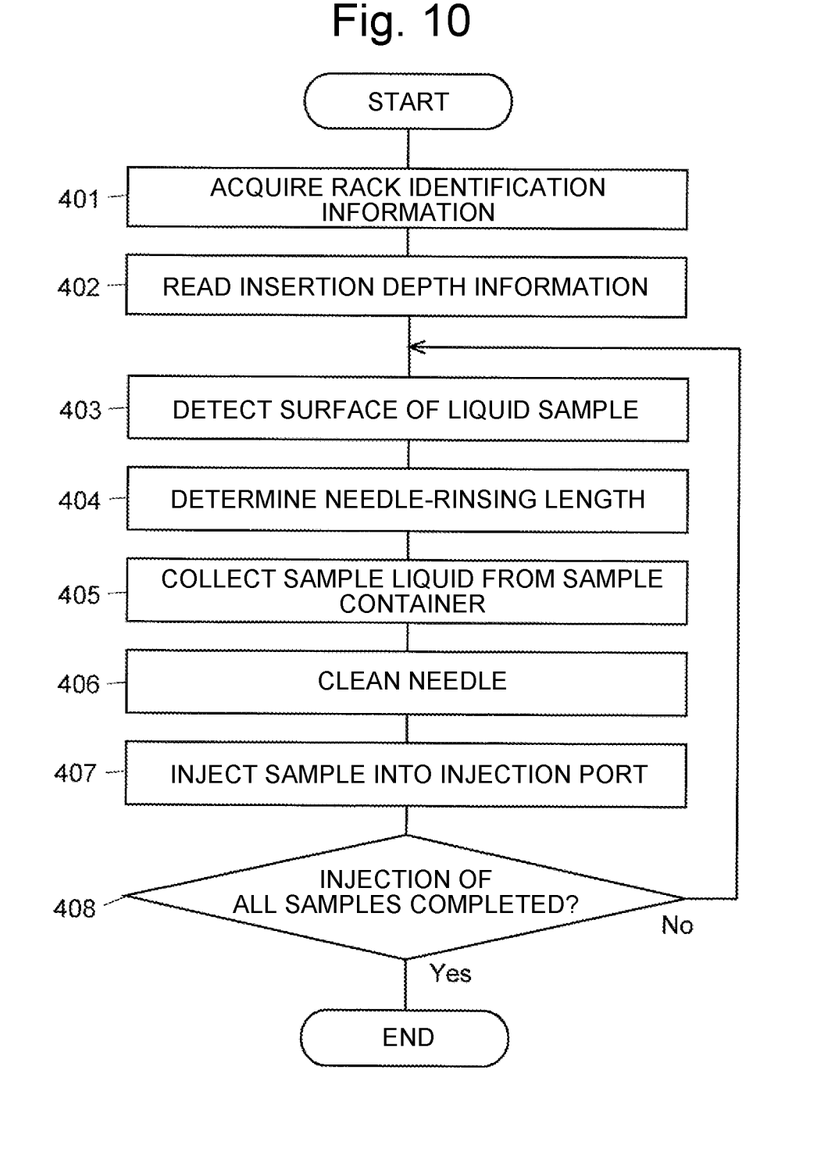
FIG. 10 a flowchart showing a procedure for setting the needle-rinsing length and the subsequent procedure from sample collection to sample injection in the liquid handler according to the third embodiment.

The procedure for setting the needle-rinsing length, and the procedure for performing subsequent operations from sample collection to sample injection in the present embodiment are hereinafter described with reference to the flowchart in FIG. 10.

Initially, for a container rack 311 carrying sample containers 312 from each of which a sample is to be collected, the control unit 350 acquires the rack identification information (Step 401). For example, the rack identification information may be obtained by prompting the user to input the information as in the first embodiment, or by reading information given to the container rack 311 as in the second embodiment. The depth information acquirer 352 subsequently retrieves, from the depth information storage section 353, the insertion depth information related to the rack information obtained in Step 401 (Step 402).

Subsequently, with the container rack 311 held in the rack-holding section 310, the driving mechanism 23 lowers the needle 321. During this process, the needle-rinsing length setter 354 monitors the output signal from the liquid surface detector 381 and determines that the tip of the needle 321 has come in contact with the surface of the sample liquid (i.e., the liquid surface has been detected) when the output signal has reached a previously specified threshold (Step 403). The needle-rinsing length setter 354 recognizes the height of the tip of the needle 321 at this point as the surface level of the sample liquid and calculates the length of the portion of the needle 321 to be immersed in the sample liquid (this length is hereinafter called the "sample liquid immersion length") based on that height and the insertion depth information obtained in Step 402. Ultimately, the minimally required length for cleaning the portion extending from the tip of the needle 321 over the sample liquid immersion length (e.g., a length within a range from 100% to 110% of the sample liquid immersion length) is set as the needle-rinsing length (Step 404). The sample liquid immersion length can be determined, for example, by calculating the distance from the position of the upper end of the sample container 312 to the surface level and subtracting its value from the insertion depth information, which is the "depth value of the liquid container" or "value of the amount of descent of the tip of the needle from the upper end of the sample container".

Subsequently, the operation of collecting the sample liquid from one sample container 312 is performed in a similar manner to the first embodiment (Step 405), followed by the operation of cleaning the needle 321 by inserting, into the rinse port 30, the portion of the needle 321 extending from the tip of the needle over the needle-rinsing length (Step 406). Then, the needle 321 is plunged into the injection port 340 to inject the sample liquid (Step 407). After that, Steps 403 through 407 are repeated until the collection of the sample liquids from all of the previously set sample containers 312 and the injection of those sample liquids into the injection port 340 are completed (i.e., until the result of Step 408 in FIG. 10 becomes "Yes").

As described thus far, the liquid handler according to the present embodiment can take into account the surface level of the sample liquid in the sample container in addition to the insertion depth information when setting the needle-rinsing length. Even when the depth of the sample container is the same, a shorter needle-rinsing length will be set for a smaller amount of liquid in the container (i.e., for a lower level of liquid surface), so that the throughput of the sample collection can be further improved.

Modes for carrying out the present invention have been described thus far by means of specific examples. It should be noted that the present invention is not limited to the first through third embodiments, which are allowed to be appropriately changed or modified within the spirit of the present invention. For example, although the first through third embodiments are all concerned with examples in which the present invention is applied in a liquid handler which can function as both an autosampler and a fraction collector, the present invention is not limited to this type of device; for example, it can be similarly applied in a normal type of autosampler.

In Steps 201 and 202 in FIG. 3 (or Steps 401 and 402 in FIG. 10), the device receives an input of the rack identification information from the user (or reads the rack identification information with the rack information reader 271) and retrieves the insertion depth information corresponding to that rack identification information from the depth information storage section 53 or 353. Alternatively, the device may be configured to receive an input of container identification information representing the type of sample containers 12 or 312 (e.g., the name, model number or appropriate character string given to the sample containers 12 or 312) from the user and retrieve the insertion depth information corresponding to that container identification information from the depth information storage section 53 or 353. In this case, the input unit 61 or 361, display unit 62 or 362 and display controller 55 or 355 cooperate with each other to function as the "container identification information input receiver" in the present invention. When this configuration is chosen, the manufacturer or the user of the liquid handler according to the present embodiment should previously relate the container identification information of each type of sample container to the insertion depth information and store these pieces of information in the depth information storage section 53 or 353 for each of the plurality of types of sample containers 12 or 312 to be used in the liquid handler concerned.

[Modes]

It is evident for a person skilled in the art that the previously described illustrative embodiments are specific examples of the following modes of the present invention.

(Clause 1) A sampling device according to one mode of the present invention includes:
 a sampling needle configured to be inserted into a sample container to collect a sample liquid in the sample container;
 a needle-driving mechanism configured to change the position of the sampling needle; a depth information acquirer configured to acquire insertion depth information which is a piece of information concerning an insertion depth of the sampling needle into the sample container;
 a rinse storage tank having an opening on the top;
 a needle-rinsing length setter configured to set a needle-rinsing length which is an insertion length of the sampling needle into the rinse storage tank, based on the insertion depth information; and
 a controller configured to control the needle-driving mechanism so that a portion of the sampling needle extending from the tip of the sampling needle over the needle-rinsing length is inserted into the rinse storage tank,
 where the needle-rinsing length setter is configured to set the needle-rinsing length to be shorter as the insertion depth of the sampling needle into the sample container becomes smaller.

In the sampling device according to Clause 1, when the insertion depth of the sampling needle into the sample container is relatively small, both the period of time required for inserting the sampling needle into the rinse storage tank and the period of time required for pulling the sampling needle from the rinse storage tank will be reduced as compared to the case where the insertion depth is relatively large. Consequently, the sample collection can be performed with a higher level of throughput than in the case where the almost entire of the sampling needle is always inserted into the rinse storage tank in the cleaning process regardless of the insertion depth of the sampling needle into the sample container.

(Clause 2) In the sampling device according to Clause 2, which is one mode of the sampling device according to Clause 1, the insertion depth information is a value of the depth of the sample container or a value of the amount of descent of the tip of the sampling needle from the upper end of the sample container.

(Clause 3) In the sampling device according to Clause 3, which is one mode of the sampling device according to Clause 2, the needle-rinsing length setter is configured to set the needle-rinsing length within a range from 100% to 110% of the value of the depth of the sample container or the value of the amount of descent of the tip of the sampling needle from the upper end of the sample container.

The sampling device according to Clause 3 can set the needle-rinsing length to be the minimally required length for removing the sample liquid which has been adhered to the outer circumferential surface of the sampling needle in the process of collecting the sample from the sample container. Therefore, the period of time required for inserting and pulling the sampling needle into and from the rinse storage tank can be minimized.

(Clause 4) The sampling device according to Clause 4, which is one mode of the sampling device according to one of Clauses 1-3, further includes:
 a depth information storage section configured to hold, for each of a plurality of types of the sample container, container identification information which is a piece of information for identifying the type of sample container and the insertion depth information of the sample container, with the container identification information and the insertion depth information related to each other; and
 a container identification information input receiver configured to receive an input of the container identification information from a user,
 where the depth information acquirer is configured to retrieve, from the depth information storage section, the insertion depth information related to the container identification information received through the container identification information input receiver.

(Clause 5) The sampling device according to Clause 5, which is one mode of the sampling device according to one of Clauses 1-3, further includes:
 a rack-holding section configured to hold a container rack carrying the sample container;
 a depth information storage section configured to hold, for each of a plurality of types of the container rack, rack identification information which is a piece of information for identifying the type of the container rack and the insertion depth information of the sample container to be set in the container rack, with the rack identification information and the insertion depth information related to each other; and a rack identification information acquirer configured to acquire the rack identification information related to the container rack carrying the sample container from which the sample liquid is to be collected with the sampling needle, where:

the sampling needle is configured to collect the sample liquid from the sample container carried by the container rack in the rack-holding section; and the depth information acquirer is configured to retrieve, from the depth information storage section, the insertion depth information related to the rack identification information acquired by the rack identification information acquirer.

(Clause 6) In the sampling device according to Clause 6, which is one mode of the sampling device according to Clause 5, the rack identification information acquirer is configured to read the rack identification information possessed by the container rack held in the rack-holding section.

The sampling device according to Clause 6 can automatically read rack identification information from the container rack in the rack-holding section, thereby making it unnecessary for the user to manually input rack identification information.

(Clause 7) The sampling device according to Clause 7, which is one mode of the sampling device according to one of Clauses 1-6, further includes:

a liquid surface detector configured to detect that the sampling needle is in contact with the surface of the sample liquid, where the needle-rinsing length setter is configured to set the needle-rinsing length based on the insertion depth information and an output signal from the liquid surface detector.

The sampling device according to Clause 7 can set the needle-rinsing length more appropriately by considering the depth of the sample liquid in the sample container in addition to the insertion depth.

(Clause 8) In the sampling device according to Clause 8, which is one mode of the sampling device according to Clause 7, the needle-rinsing length setter is configured to determine a sample liquid immersion length which is the length of the portion of the sampling needle immersed in the sampling liquid, based on the insertion depth information and the output signal from the liquid surface detector, and to set the needle-rinsing length within a range from 100% to 110% of the sample liquid immersion length.

The sampling device according to Clause 8 can set the needle-rinsing length to be the minimally required length for removing the sample liquid which has been adhered to the outer circumferential surface of the sampling needle in the process of collecting a sample from the sample container. Therefore, the period of time required for inserting and pulling the sampling needle into and from the rinse storage tank can be minimized.

(Clause 9) In the sampling device according to Clause 9, which is one mode of the sampling device according to one of Clauses 1-8, the sampling device is a liquid handler configured to function as both an autosampler for introducing a sample into a liquid chromatograph and a fraction collector for preparative separation of an eluate from the liquid chromatograph.

In a liquid handler, a portion of an eluate from a column may be preparatively collected in a test tube or similar container having a comparatively large depth, and the eluate in this container may be sampled and once more introduced into the column. Therefore, liquid handlers often use a longer sampling needle than a device which uses only short sample containers having a comparatively small depth, such as vials. The sampling device according to Clause 9 is this type of liquid handler, with the present invention applied, whereby the period of time required for inserting and pulling the sampling needle can be effectively reduced.

REFERENCE SIGNS LIST

10 . . . Rack-Holding Section
11 . . . Container Rack
12 . . . Sample Container
21 . . . Needle
23 . . . Driving Mechanism
30 . . . Rinse Port
40 . . . Injection Port
50 . . . Control Unit
51 . . . Driving Mechanism Controller
52 . . . Depth Information Acquirer
53 . . . Depth Information Storage Section
54 . . . Needle-Rinsing Length Setter
55 . . . Display Controller
61 . . . Input Unit
62 . . . Display Unit
271 . . . Rack Information Reader
272 . . . IC Tag
381 . . . Liquid Surface Detector

The invention claimed is:

1. A sampling device, comprising:

a sampling needle configured to be inserted into a sample container to collect a sample liquid in the sample container;

a needle-driving mechanism configured to change a position of the sampling needle;

a depth information acquirer configured to acquire insertion depth information which is a piece of information concerning an insertion depth of the sampling needle into the sample container;

a rinse storage tank having an opening on a top;

a needle-rinsing length setter configured to set a needle-rinsing length which is an insertion length of the sampling needle into the rinse storage tank, based on the insertion depth information; and a controller configured to control the needle-driving mechanism so that a portion of the sampling needle extending from a tip of the sampling needle over the needle-rinsing length is inserted into the rinse storage tank to a depth based on the set needle-rinsing length, wherein the controller is configured to apply a different needle-rinsing length to the needle according to the insertion depth of the sampling needle into the sample container, where the needle-rinsing length setter is configured to set the needle-rinsing length to be shorter as the insertion depth of the sampling needle into the sample container becomes smaller.

2. The sampling device according to claim 1, wherein the insertion depth information is a value of a depth of the sample container or a value of an amount of descent of the tip of the sampling needle from an upper end of the sample container.

3. The sampling device according to claim 2, wherein the needle-rinsing length setter is configured to set the needle-rinsing length within a range from 100% to 110% of the value of the depth of the sample container or the value of the amount of descent of the tip of the sampling needle from the upper end of the sample container.

4. The sampling device according to claim 1, further comprising:
- a depth information storage section configured to hold, for each of a plurality of types of the sample container, container identification information which is a piece of information for identifying the type of sample container and the insertion depth information of the sample container, with the container identification information and the insertion depth information related to each other; and
- a container identification information input receiver configured to receive an input of the container identification information from a user,
- where the depth information acquirer is configured to retrieve, from the depth information storage section, the insertion depth information related to the container identification information received through the container identification information input receiver.

5. The sampling device according to claim 1, further comprising:
- a rack-holding section configured to hold a container rack carrying the sample container;
- a depth information storage section configured to hold, for each of a plurality of types of the container rack, rack identification information which is a piece of information for identifying the type of the container rack and the insertion depth information of the sample container to be set in the container rack, with the rack identification information and the insertion depth information related to each other; and
- a rack identification information acquirer configured to acquire the rack identification information related to the container rack carrying the sample container from which the sample liquid is to be collected with the sampling needle, where:
- the sampling needle is configured to collect the sample liquid from the sample container carried by the container rack in the rack-holding section; and
- the depth information acquirer is configured to retrieve, from the depth information storage section, the insertion depth information related to the rack identification information acquired by the rack identification information acquirer.

6. The sampling device according to claim 5, wherein the rack identification information acquirer is configured to read the rack identification information possessed by the container rack held in the rack-holding section.

7. The sampling device according to claim 1, further comprising:
- a liquid surface detector configured to detect that the sampling needle is in contact with the surface of the sample liquid,
- where the needle-rinsing length setter is configured to set the needle-rinsing length based on the insertion depth information and an output signal from the liquid surface detector.

8. The sampling device according to claim 7, wherein the needle-rinsing length setter is configured to determine a sample liquid immersion length which is a length of a portion of the sampling needle immersed in the sampling liquid, based on the insertion depth information and the output signal from the liquid surface detector, and to set the needle-rinsing length within a range from 100% to 110% of the sample liquid immersion length.

9. The sampling device according to claim 1, wherein the sampling device is a liquid handler configured to function as both an autosampler for introducing a sample into a liquid chromatograph and a fraction collector for preparative separation of an eluate from the liquid chromatograph.

* * * * *